(12) United States Patent
Elsässer et al.

(10) Patent No.: US 8,365,702 B2
(45) Date of Patent: Feb. 5, 2013

(54) INTERNAL COMBUSTION ENGINE

(75) Inventors: Alfred Elsässer, Keltern (DE); Jörg Rückauf, Schwieberdingen (DE); Dietmar Schwarzenthal, Ditzingen (DE); Van-Khanh Tran, Weissach (DE)

(73) Assignees: Mahle International GmbH (DE); Dr. Ing. H.C.F. Porsche Aktiengesellschaft (DE)

( * ) Notice: Subject to any disclaimer, the term of this patent is extended or adjusted under 35 U.S.C. 154(b) by 415 days.

(21) Appl. No.: 12/596,287

(22) PCT Filed: Apr. 15, 2008

(86) PCT No.: PCT/EP2008/054522
§ 371 (c)(1),
(2), (4) Date: Mar. 25, 2010

(87) PCT Pub. No.: WO2008/128922
PCT Pub. Date: Oct. 30, 2008

(65) Prior Publication Data
US 2010/0180852 A1      Jul. 22, 2010

(30) Foreign Application Priority Data

Apr. 19, 2007   (DE) .......................... 10 2007 018 917

(51) Int. Cl.
*F02D 41/00*   (2006.01)
*F01L 3/06*    (2006.01)
(52) U.S. Cl. ..................................... 123/429; 123/188.8
(58) Field of Classification Search .... 123/90.11–90.17, 123/90.21, 188.8, 306–308, 429–433
See application file for complete search history.

(56) References Cited

U.S. PATENT DOCUMENTS
(Continued)

FOREIGN PATENT DOCUMENTS

| DE | 19754287 | 6/1999 |
|----|----------|--------|
| DE | 19922607 | 3/2001 |

(Continued)

OTHER PUBLICATIONS

English abstract for DE-19754287.

(Continued)

*Primary Examiner* — John T. Kwon
*Assistant Examiner* — Johnny Hoang
(74) *Attorney, Agent, or Firm* — Rader, Fishman & Grauer PLLC

(57) ABSTRACT

The invention relates to an internal combustion engine (1), in particular in a motor vehicle, comprising at least one cylinder (3) that defines a combustion chamber (4) and in which a piston (5) can be adjusted with regard to stroke. Each cylinder (3) comprises at least one intake opening (6) for a fresh mixture. Each intake opening (6) is associated with an intake valve (7) that works together with an associated valve seat (8) in order to control the intake opening (6). At least one such intake opening (6) is provided with a guide mask (9) that laterally encloses the respective valve seat (8) on a side that is opposite the respective combustion chamber (4) along a delimited circumferential section. Each intake opening (6) is associated with an intake canal (10). In order to improve the operation of the internal combustion engine (1), at least one intake canal (10) leading to a masked intake opening (6) is associated with an additional valve (11) for controlling the intake canal (10).

19 Claims, 3 Drawing Sheets

U.S. PATENT DOCUMENTS

Figure 1:
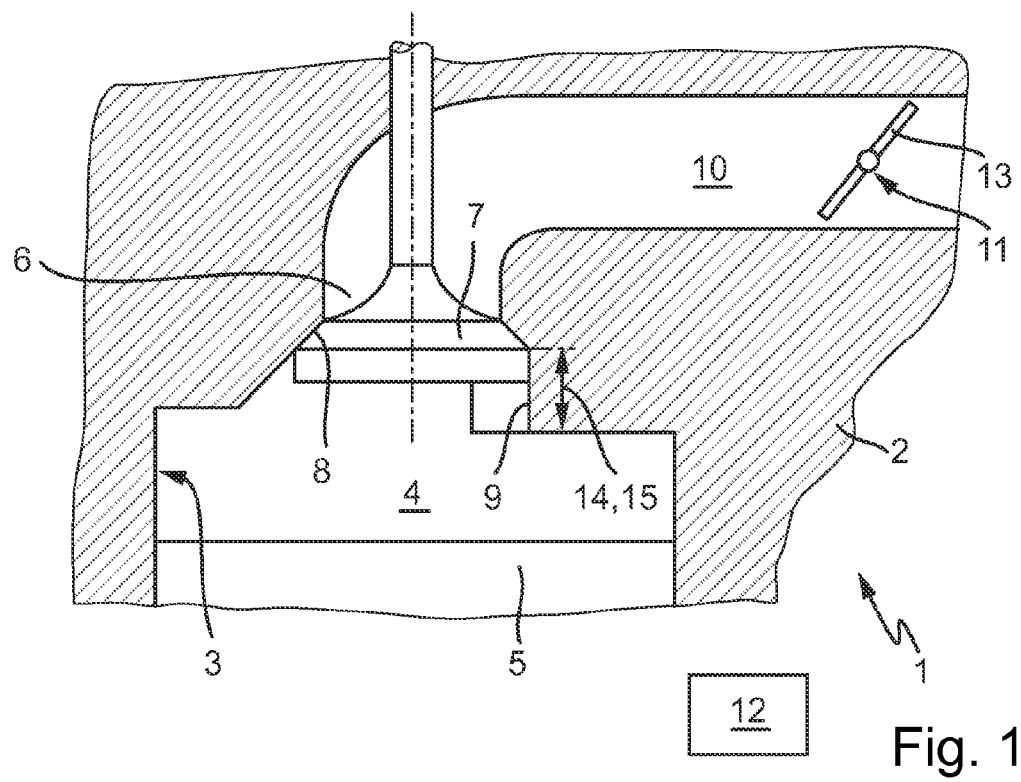

| | | | |
|---|---|---|---|
| 3,995,609 A * | 12/1976 | Klomp | 123/188.8 |
| 4,354,463 A | 10/1982 | Otani et al. | |
| 4,724,809 A * | 2/1988 | Burandt | 123/430 |
| 4,756,281 A * | 7/1988 | Chen et al. | 123/90.6 |
| 4,974,566 A | 12/1990 | LoRusso et al. | |
| 5,107,802 A * | 4/1992 | Yagi et al. | 123/90.15 |
| 5,230,310 A * | 7/1993 | Hashimoto | 123/188.8 |
| 5,271,362 A * | 12/1993 | Kobayashi et al. | 123/299 |
| 5,797,368 A | 8/1998 | Kreuter et al. | |
| 5,950,582 A | 9/1999 | Stein | |
| 5,975,047 A * | 11/1999 | Kamura et al. | 123/305 |
| 6,253,729 B1 * | 7/2001 | Suzuki et al. | 123/302 |
| 6,578,564 B2 * | 6/2003 | Bagnasco | 123/698 |
| 6,860,252 B1 * | 3/2005 | Ganoung | 123/308 |
| 6,877,474 B2 * | 4/2005 | Radel | 123/196 R |
| 7,004,143 B2 * | 2/2006 | Fuwa | 123/336 |
| 7,080,624 B2 * | 7/2006 | Britsch et al. | 123/299 |
| 7,146,966 B2 * | 12/2006 | Nakamura | 123/481 |
| 7,269,499 B2 * | 9/2007 | Murakami et al. | 701/112 |
| 7,418,946 B2 * | 9/2008 | I et al. | 123/406.45 |
| 2004/0244756 A1 | 12/2004 | Elsasser et al. | |

FOREIGN PATENT DOCUMENTS

| | | |
|---|---|---|
| DE | 10032669 | 1/2002 |
| DE | 10140706 | 2/2003 |
| DE | 10309730 | 11/2004 |
| DE | 1020050994 | 2/2007 |
| EP | 0764770 | 7/2000 |

OTHER PUBLICATIONS

English abstract for DE-10309730.
English abstract for DE-102005033994.
English abstract for DE-10032669.

* cited by examiner

INTERNAL COMBUSTION ENGINE

CROSS-REFERENCES TO RELATED APPLICATION

This application is a National Stage application which claims the benefit of International Application No. PCT/EP2008/054522 filed Apr. 15, 2008, which claims priority based on German Patent Application No. 102007018917.8, filed Apr. 19, 2007, both of which are hereby incorporated by reference in their entirety.

The present invention relates to an internal combustion engine, in particular in a motor vehicle, having the features of the preamble of claim 1. The invention furthermore relates to an operating method belonging thereto.

Document U.S. Pat. No. 4,974,566 discloses an internal combustion engine that has at least one cylinder that limits a combustion chamber and furthermore in which a piston is stroke adjustable. Each cylinder has an intake opening for fresh mixture that is associated with an intake valve that works together with a valve seat belonging thereto in order to control the intake opening. A guide mask is configured near the intake opening, said guide mask laterally enclosing the valve seat in a side that is opposite the combustion chamber along a limited circumferential section. Furthermore, the intake opening is associated with an intake canal for supplying fresh mixture.

By means of such a guide mask, a directed inflow of fresh mixture into the combustion chamber can be generated in small valve strokes in which the intake valve does not rise above the guide mask from the valve seat. In such small valve strokes, there cannot be a complete flow along the circumference of the intake valve owing to the guide mask, but rather only in the region left free by the guide mask. In larger valve strokes, in which the intake valve is raised above the guide mask from the valve seat, the intake valve can be flowed around on all sides, by means of which a reduced resistance to inflow is present, in particular.

The known internal combustion engine moreover comprises a variable valve gear train that makes it possible, as a function of load, to operating the intake valves with differing maximum strokes. With a smaller load, the maximum stroke of the intake valve is limited to the height of the guide mask, by means of which an improved mixture formation can be achieved with a smaller load. With a larger load, the valve gear train realises a correspondingly larger maximum stroke that goes beyond the height of the guide mask. Variable valve gear trains with which the maximum stroke of intake valves can be changed can be realised only with great outlay.

An additional internal combustion engine with masked intake valves is disclosed in document U.S. Pat. No. 5,950,582, for example.

The present invention addresses the problem of providing an improved embodiment for an internal combustion engine of the type previously mentioned or for an associated operational method, said embodiment being characterised in particular by a comparably economical realisation.

This problem is solved according to the invention by the subject matter of the independent claims. Advantageous embodiments are the subject matter of the dependent claims.

The invention is based on the general concept of associating additional valves with intake canals that lead to masked intake openings, each of said additional valves being used to open or block the intake canals. By blocking the intake canal, the inlet of fresh mixture into the combustion chamber can be prevented, even if the intake valve belonging thereto is open. Using such additional valves, the filling of the combustion chamber with fresh mixture can be varied with regard to the duration and moment of inlet, all without a variable valve drive train being required. Such additional valves can be realised, in particular, more economically than a variable valve drive train with adjustable maximum stroke of the intake valves.

The internal combustion engine created in such a fashion can preferably be operated in such a manner that during a switching operation state of the internal combustion engine, said state being characterised by the fact that the load of the internal combustion engine is smaller than a pre-determined maximum load and/or that the rotational speed of the internal combustion engine is smaller than a pre-determined maximum rotational speed, the additional valve blocks the respective intake canal as long as the stroke of the intake valves associated with the respective masked intake opening is greater than a predetermined switching stroke. Said switching operation state preferably comprises small and median loads as well as small and median rotational speeds. The switching stroke can advantageously be defined by the height of the guide mask. The guide mask can then bring about the circumferentially limited flowing around of the intake valve beneath the switching stroke. In valve strokes that go thereby end, there is complete flow in the circumferential direction around the intake valve. This means, in particular, that the guide mask is active until the switching stroke and is moreover essentially deactivated in strokes that go beyond the intake valve. In such a driving of each of the additional valves, the filling of the combustion chamber with fresh mixture is limited to the beginning of the opening motion of the intake valve or to a late intake time frame until the end of the closing motion of the intake valve. In the respective time frame, the oriented inflow can be realized in the combustion chamber owing to the then active guide mask and furthermore used to improve operational behaviour.

In an advantageous development, two different partial regions can now be realised within the switching operational state by means of a switching load that is smaller than the maximum load and/or by means of a switching rotational speed that is smaller than the maximum rotational speed. The "lower" partial region, in which the load is smaller than the switching load and/or in which the rotational speed is smaller than the switching rotational speed, the supply of fresh mixture is effected exclusively in the early inlet time frame, by means of which an early intake closing can be realised. In contrast thereto, in the "upper" partial region of the switching operational state, in which the rotational speed is between the switching rotational speed and the maximum rotational speed and/or in which the load is between the switching load and the maximum load, the late inlet time frame is used for the charging of the combustion chamber with fresh mixture, by means of which a late intake opening can be realised. It has been shown that by means of this manner of proceeding, the emission of pollutants and fuel economy data of the internal combustion engine can be improved with smaller loads.

Additional important features and advantages of the invention can be found in the dependent claims, in the drawings, and in the pertinent description of the figures with reference to the drawings.

It is understood that the features described above and those to be described in what follows can be used not only in the particular cited combination; but also in other combinations or independently without departing from the scope of the present invention.

Preferred embodiments of the invention are shown in the drawings and are described in more detail in the following description, the same reference numerals referring to components which are the same or functionally the same or similar.

Figure 2:
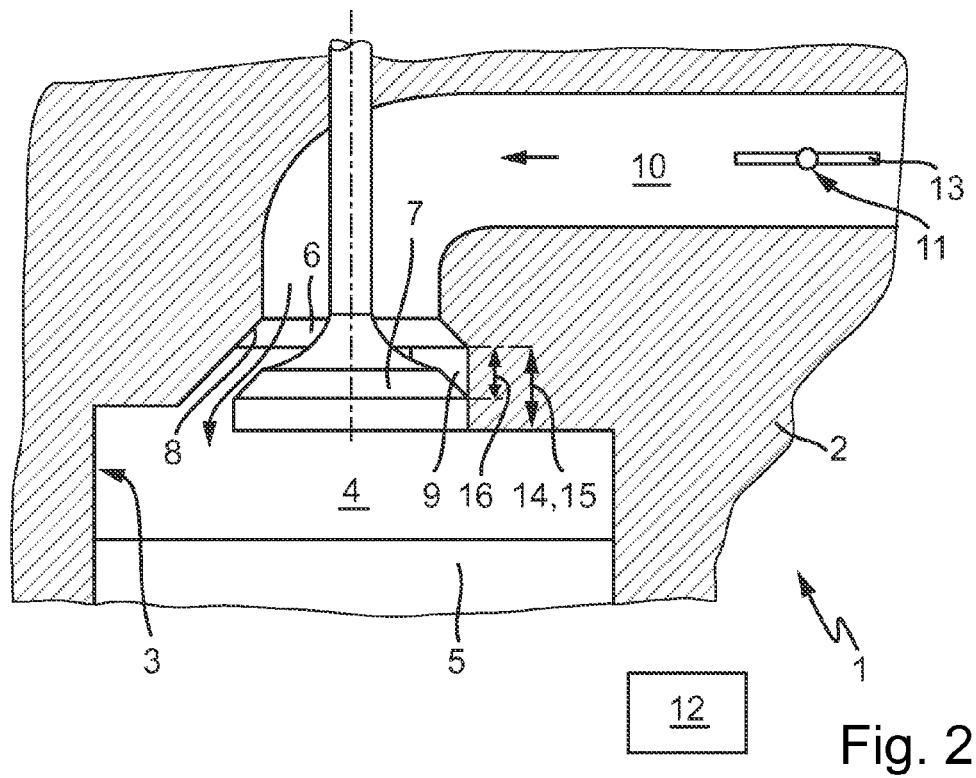
Figure 3:
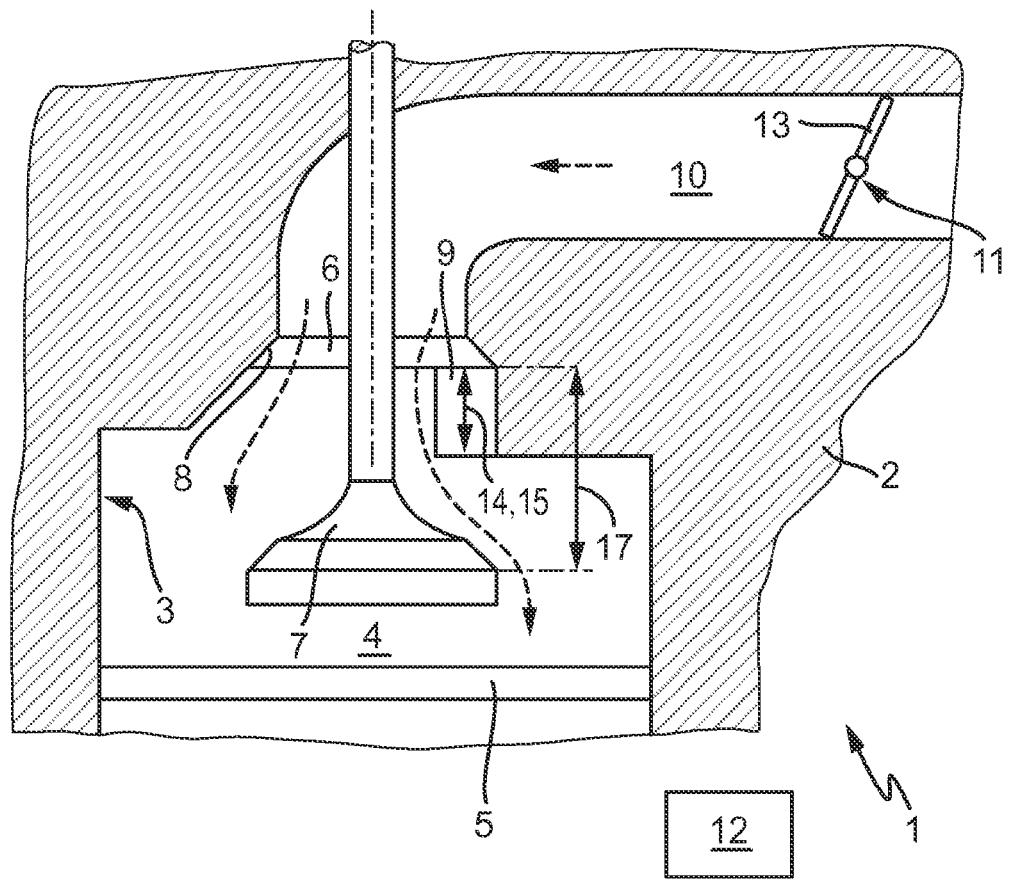
Figure 4:
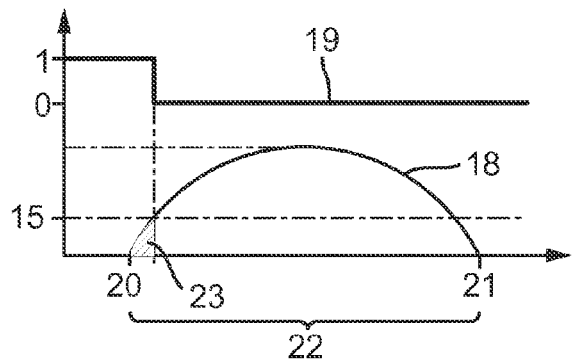
Figure 5:
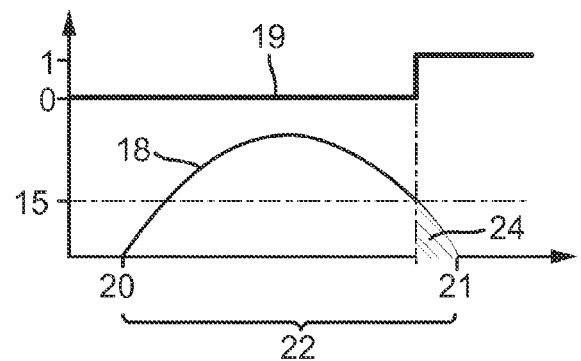
Figure 6:
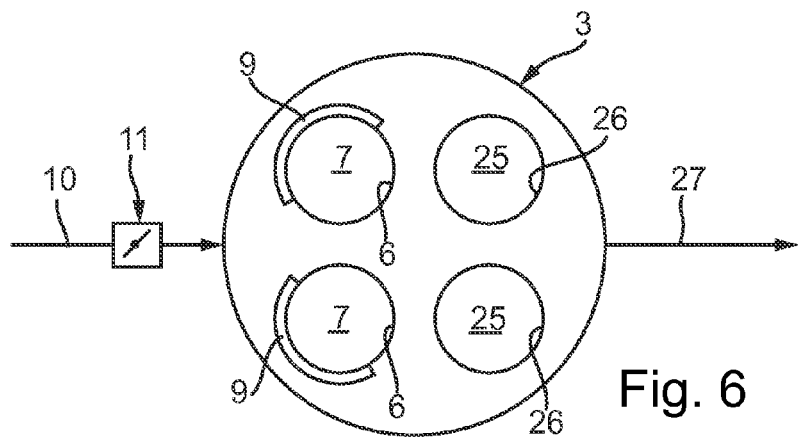
Figure 7:
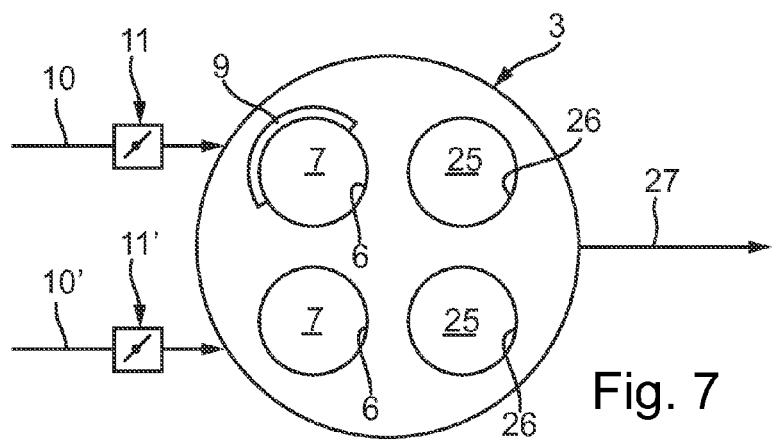

In the figures,

FIGS. 1 to 3 schematically show a very simplified sectional representation of an internal combustion engine in the region of an intake valve during different valve strokes, FIGS. 4 and 5 each schematically shows a diagram for illustrating the temporal progression of an intake valve stroke and of switching positions of an additional valve in different operational states of the internal combustion engine, FIGS. 6 and 7 each schematically shows an interior view of a cylinder from the perspective of a piston on charge-changing valves, however in different embodiments.

Corresponding to FIGS. 1 to 3, an internal combustion engine 1, which is preferably arranged in a motor vehicle, comprises an engine block 2 in which at least one cylinder 3 is designed. The internal combustion engine 1 can be a diesel engine or preferably an Otto engine. It is evident that the internal combustion engine 1 conventionally has more than one cylinder 3. They can, in principle, be designed in the same manner as the cylinder 3 shown here. The cylinder 3 is adjacent to a combustion chamber 4. A piston 5 is conventionally arranged in the cylinder in a stroke-adjustable manner. The cylinder 3 furthermore has at least one intake opening 6, through which the fresh mixture flows into the combustion chamber 4. The intake opening 6 is associated with an intake valve 7 that works together with a valve seat 8 to control the intake opening 6.

A guide mask 9 is provided in the intake opening 6 shown. Said guide mask laterally encloses the valve seat 8 on a side that is opposite the combustion chamber 4 along a limited circumferential section, for example spanning approximately 120° to 180°. An intake canal 10 is provided on the respective intake opening 6 in order to supply said intake opening with fresh mixture.

An additional valve 11 is now arranged, according to the invention, in the intake canal 10 leading to the masked intake opening 6, with which additional valve the intake canal 10 can be controlled, that is to say it can be opened or blocked. A valve control 12 is provided for actuating the additional valve 11, which valve control is here only symbolically indicated. This valve control 12 communicates with a here-unshown actuating drive of the additional valve in order to shift a valve member 13 arranged in the intake canal 10 at least between an open position, as shown in FIG. 2, and a closed position, as shown in FIG. 3. FIG. 1 shows a possible neutral positioning or intermediate positioning of the valve member 13.

The additional valve 11 can be a rapid-switching valve that can be switched in the millisecond range, in particular, between the closed position and the open position. In particular, a rapid-switching valve open and close more quickly than the intake valve 7. Furthermore, the additional valve 11 can be a dynamically-controllable valve by means of which the switching time and switching speed of the additional valve 11 are adaptable to the current operational state of the internal combustion engine 1, which current operational state is defined by load and rotational speed. Additionally or alternatively, the additional valve 11 can be designed as a discontinuously-operating valve or as a continuously-operating valve. In a discontinuously-operating valve, the valve member 13, for example a butterfly check valve, can be switched between the open position and the closed position, it being characteristic that the valve member 13 rests in the respective switching position until the next switching process. Furthermore, the direction of movement between switching processes that follow one after the other can be respectively directed against one another. In a continuously-operating valve, the valve member 13 is permanently in motion and passes through both of the two switching states. In this manner, the opening time frame and the closing time frame can be realized. For example, a continuously-operating valve can have as a valve member 13 a rotary slide valve or a flap valve that continually rotate in the same direction of motion.

FIGS. 1 to 3 show a height of the guide mask 9 with reference sign 14. This height 14 corresponds to the reach of guide mask 9 from the lower end of the valve seat 8 in the direction of the stroke of the intake valve 7 into the combustion chamber 4. This height 14 of the guide mask 9 can advantageously be used to define a switching stroke 15 for the intake valve 7. The switching stroke 15 can, for example, can be selected as large as the height 14. For the sake of simplicity, in the shown examples, the switching stroke 15 is put on a level with the height 14 of the guide mask 9. In theory, the switching stroke 14 can, however, have a smaller value than the height 14 or also have a greater value in such a manner that in the presence of the switching stroke 15, the mask 9 is not quite yet active or has just ceased being active.

In FIG. 1, the intake valve 7 is closed so that the intake valve stroke has a value of zero in FIG. 1. In FIG. 2, the intake valve 7 has a small stroke 16 that is smaller than the height 14 and that is smaller, in particular, than said switching stroke 15.

With such a small valve stroke 16, the guide mask 9 is active so that the intake valve 7 can be flowed around only in a partial region of its circumference that is not shielded by the guide mask 9, which is symbolized by an arrow that is represented with a solid line. In contrast thereto, FIG. 3 shows a state in which the intake valve 7 has a larger valve stroke 17 that is larger than the switching stroke 15 so that the intake valve 7 protrudes over the guide mask 9 into the combustion chamber 4. The guide mask 9 is thereby deactivated so that an air flow all around the intake valve 7, that is to say also in the circumferential region of the guide machine 9, can be regulated. This air flowing all around is indicated in FIG. 3 by an arrow represented with a broken line. In the state shown in FIG. 3, the intake valve 7 being flowed about on all side by such an air flow nevertheless does not take place since here the additional valve 11 blocks the intake canal 10.

The internal combustion engine 1 can be preferably be operated as follows:

By means of a pre-determined maximum load and/or by means of a pre-determined maximum rotational speed, a switching operation range is defined for the internal combustion engine 1. The load is smaller in the switching operation range than the maximum load and/or the rotational speed is smaller than the maximum rotational speed. In this switching operation range, a directed inflow of fresh mixture into the combustion chamber is intended to be realized by means of the guide mask 9. For this purpose, the additional valve 11 is driven in such a manner by means of the valve control 12 that it blocks the intake canal 10 for as long as the stroke of the corresponding intake valve 7 is larger than the switching stroke 15. Correspondingly, in the state shown in FIG. 3, the additional valve 11 is misaligned in its blocking position. An inflow of fresh mixture into the combustion chamber 4 does not take place. An inflow of fresh mixture into the combustion chamber 4 is thus intended to occur only in the instance of strokes of the intake valve 7 that are smaller than the switching stroke 15.

Within each intake time frame, the respective intake valve 7 has two regions in which its strokes are smaller than the switching stroke 15, at which the intake stroke increases from the starting value of zero and toward the end of the closing motion of the intake valve 7 at which its stroke nears the value of zero again. Thus, the state shown in FIG. 2 can arise both in an early partial time frame of the intake time frame as well as in a late partial time frame of the intake time frame.

Preferred embodiments are elucidated in greater detail in FIGS. 4 and 5. In FIGS. 4 and 5 represent a stroke progression 18 of the intake valve 7 as a function of time and the crankshaft angle (abscissas) as well as a switching state progression 19 of the additional valve 11 (ordinates). The intake valve 7 defines through an opening point in time 20 and a closing point in time 21 an intake time frame 22. In the stroke progression 18, the switching stroke 15 is recorded with a broken line.

The additional valve 7 has a virtually digital switching state progression 19. The value "0" represents the closed position of the additional valve 11, while the value "1" represents the open position of the additional valve 11.

FIG. 4 shows a "lower" partial region of the switching operation range that is characterized in that the load is smaller than a pre-determined switching load and/or in that the rotational speed is smaller than a pre-determined switching rotational speed. In the way, said switching load is regardless smaller than the maximum load and/or the switching load is smaller than said maximum rotational speed. By means of the switching rotational speed and/or the switching load, the lower partial range is thus delimited during the switching operation range from an "upper" partial range of the switching operation range. The upper partial range is defined by loads that are larger than the switching load and are smaller than the maximum load and/or by rotational speeds that are larger than the switching rotational speed and are smaller than the maximum rotational speed.

Should the internal combustion engine be operated in the lower partial range of the switching operation range, the additional valve 11 will be driven by means of the valve control 12 in such a manner that is blocks the associated intake canal 10 only if the stroke of the intake valve 7 associated with the masked intake opening 6 upon opening, that is to say essentially "from beneath" the switching stroke 15. A comparably small early partial time frame 23 is thereby cut out of the intake time window 22, an early intake closing being thereby realized. For the loading process subsequent thereto, the additional valve 11 can, in theory, can be displaced into the open position again at any point in time whatsoever between the closing point in time 21 of the intake valve 7 and the next opening point in time 20 of the intake valve 7. It is conceivable in particular, that the additional valve 11 is opened at the same time as the intake valve 7 in order to achieve a pulse-like loading of the combustion chamber 4 with fresh mixture, for example.

If, in contrast thereto, the internal combustion engine 1 is operated in the upper partial range of the switching operation range, the additional valve 11 is driven by means of the valve control 12 in such a manner that said additional valve opens the intake canal 10 only upon the closing of the associated intake valve 7, that is to say essentially "from above" the switching stroke 15. According to FIG. 5, a comparably small, late partial time frame 24 is thereby cut out of the opening time frame 22, by means of which a late intake opening is realized. The additional valve 11 can, in theory, be closed again at any point in time whatsoever subsequent to the closing point in time 21 of the intake valve 7 and prior to the next opening point in time 20 of the intake valve 7.

It is evident that the switching stroke 15 can also be configured so that upon early intake closing, a complete flowing of the intake valve 7 can already exist or that upon late intake opening, a complete flowing about the intake valve 7 can still take place prior to the mask 9 becoming active and the air mass that has been taken in until that point is impinged upon with the subsequent flow of swirling air.

Likewise, different switching strokes 15 can be operative upon opening and upon closing. Furthermore, a dependence of the switching stroke 15 on the operational state of the internal combustion engine 1 is also conceivable.

Corresponding to FIG. 6, the cylinder 3 can, for example, have two intake valves 7 and, for example, two discharge valves 25. A common intake valve 10 is associated with both of the intake valves 7 or with the associated intake openings 6, said common intake valve being controllable with such an additional valve 11. Both of the intake openings 6 are masked here, that is to say provided with a guide mask 9. The guide mask 9 are positioned in the direction of the cylinder wall and are open in the direction of the center of the cylinder 3, an inflow oriented toward the center of the combustion chamber 4 being realizable. A common discharge canal 27 is associated with both of the discharge valves 25 or with the discharge openings 26 associated therewith.

FIG. 7 shows an embodiment in which the cylinder 3 is likewise associated with two intake openings 6 with two intake valves 7 and two discharge openings 26 with two discharge valves 25. However, in this embodiment, only one of the intake openings 6 is masked by means of guide mask 9. The other intake opening 6 is not masked. In this embodiment, both of the intake openings 6 are associated with separate intake canals 10 and 10'. The intake canal that leads to the masked intake opening 6 can be controlled with the additional valve 11. The other intake canal 10' that leads to the intake opening 6 that is not masked can likewise be associated with an additional valve 11' that, however, can, in theory, have a different configuration from the additional valve 11 associated with the intake canal 10 leading to the masked intake opening 6. The intake valve 6 associated with this other intake canal 10' can likewise be designed so as to be able to be activated and deactivated. In the embodiment shown in FIG. 7, the operation procedure can be modified to the extent that, for example, in the switching operation range, the intake canal 10' leading to the intake valve 6 that is not masked can be permanently blocked by means of the additional valve 11' arranged there or by means of the associated deactivated intake valve 6 in its closed position in such a manner that the charging with fresh mixture occurs exclusively by way of the masked intake opening 6. The control of the intake canal 10 leading to the masked intake opening 6 can then be effected, in particular, corresponding to the manner of proceeding described hereinabove.

The invention claimed is:

1. An internal combustion engine, comprising: at least one cylinder that delimits a combustion chamber, wherein a piston can be adjusted with regard to stroke, wherein at least one cylinder has at least one intake opening, wherein the intake opening is associated with an intake valve that works with an associated valve seat to control the intake opening, wherein the at least one intake opening is provided with a guide mask that laterally encloses the respective valve seat on a side that is opposite the respective combustion chamber along a delimited circumferential section, wherein the intake opening is associated with an intake canal, wherein at least one intake canal leading to a masked intake opening is associated with an additional valve for controlling the intake canal; wherein a valve control is provided for actuating the respective additional valve, said valve control selectively driving the additional valve at pre-determined operational states of the internal combustion engine in order to open and block the respective intake canal as a function of the stroke of the intake valve associated with the respective masked intake opening;

and wherein the valve control selectively drives the additional valve as a function of the current operational state of the internal combustion engine in order to block the respective intake canal as long as the intake valve associated with the respective masked intake opening has a stroke that is larger than a pre-determined switching stroke.

2. The internal combustion engine as specified in claim 1, wherein the valve control selectively drives the additional valve as a function of the current operational state of the internal combustion engine in order to block the respective intake canal only when the intake valve associated with the respective masked intake opening reaches the switching stroke upon opening.

3. The internal combustion engine as specified in claim 1, wherein the valve control drives the additional valve as a function of the current operational state of the internal combustion engine to open the respective intake canal if the intake valve associated with the respective masked intake opening reaches the switching stroke upon closing.

4. The internal combustion engine as specified in claim 1 wherein the switching stroke is formed by the stroke that the respective intake valve must carry out in order to free itself from the guide mask.

5. The internal combustion engine as specified in claim 1, wherein the valve control selectively drives the additional valve to open and to block the respective intake canal if the internal combustion engine is operated in a switching operation state, wherein the load is below a pre-determined maximum load, wherein the rotational speed is below a pre-determined maximum rotational speed.

6. The internal combustion engine as specified in claim 5, wherein the valve control selectively drives the additional valve in a lower partial range of the switching operational state, wherein the load is smaller than a pre-determined switching load, wherein the rotational speed is smaller than a pre-determined switching rotational speed, to block the respective intake canal only if the intake valve associated with the respective masked intake opening reaches the switching stroke upon opening.

7. The internal combustion engine as specified in claim 5, wherein that the valve control selectively drives the additional valve in an upper partial range of the switching operational state, wherein the load is larger than a pre-determined switching load in which the rotational speed is larger than a pre-determined switching rotational speed, to open the respective intake canal only if the intake valve associated with the respective masked intake opening reaches the switching stroke upon closing.

8. The internal combustion engine as specified in claim 1, wherein at least two intake openings are provided per cylinder, said intake openings communicating with intake canals that are separated from one another,
wherein one of the intake openings is provided with a guide mask,
wherein both of the intake canals is each associated with one additional valve.

9. The internal combustion engine as specified in claim 2, wherein the valve control selectively drives the additional valve as a function of the current operational state of the internal combustion engine to open the respective intake canal if the intake valve associated with the respective masked intake opening reaches the switching stroke upon closing,
wherein the switching stroke is formed by the stroke that the respective intake valve must carry out in order to free itself from the guide mask, and
wherein the valve control selectively drives the additional valve to open and to block the respective intake canal if the internal combustion engine is operated in a switching operation state, wherein at last one of the load is below a pre-determined maximum load and in which the rotational speed is below a pre-determined maximum rotational speed.

10. The internal combustion engine as specified in claim 3, wherein the switching stroke is formed by the stroke that the respective intake valve must carry out in order to free itself from the guide mask, and
wherein the valve control selectively drives the additional valve to open and to block the respective intake canal if the internal combustion engine is operated in a switching operation state, wherein at least one of the load is below a pre-determined maximum load and in which the rotational speed is below a pre-determined maximum rotational speed.

11. The internal combustion engine as specified in claim 4, wherein the valve control selectively drives the additional valve to open and to block the respective intake canal if the internal combustion engine is operated in a switching operation state, wherein the load is below a pre-determined maximum load, wherein the rotational speed is below a pre-determined maximum rotational speed.

12. The internal combustion engine as specified in claim 6, wherein that the valve control selectively drives the additional valve in an upper partial range of the switching operational state, in which the load is larger than a pre-determined switching load, wherein the rotational speed is larger than a pre-determined switching rotational speed, to open the respective intake canal only if the intake valve associated with the respective masked intake opening reaches the switching stroke upon closing.

13. The internal combustion engine as specified in claim 1, wherein at least two intake openings are provided per cylinder, said intake openings communicating with intake canals that are separated from one another,
wherein one of the intake openings is provided with a guide mask, and
wherein both of the intake canals is each associated with one additional valve.

14. A method comprising: at least one cylinder delimiting a combustion chamber, adjusting a piston with regard to stroke, controlling at least one intake opening of at least one cylinder by associating the intake opening with an intake valve working with an associated valve seat; providing a guide mask to the at least one intake opening, the guide mask laterally enclosing the respective valve seat on a side that is opposite the respective combustion chamber along a delimited circumferential section; associating the at least one intake opening with an intake canal, associating at least one intake canal leading to a masked intake opening with an additional valve for controlling the intake canal; providing a valve control for actuating the respective additional valve; configuring the valve control for driving the additional valve at pre-determined operational states for opening and blocking the respective intake canal as a function of the stroke of the intake valve associated with the respective masked intake opening; and configuring the valve control for driving the additional valve as a function of the current operational state for block the respective intake canal as long as the intake valve associated with the respective masked intake opening has a stroke that is larger than a pre-determined switching stroke.

15. A method as specified in claim 14, utilizing an internal combustion engine comprising setting a load of the internal combustion engine to be smaller than a pre-determined maximum load in which the rotational speed of the internal combustion engine is smaller than a pre-determined maximum rotational speed; and the additional valve blocking the respective intake canal so long as the stroke of the intake valve associated with the intake opening is larger than a pre-determined switching stroke.

16. The method as specified in claim 15, wherein in a lower partial range of the switching operation range, the load is smaller than a pre-determined switching load, wherein the rotational speed is smaller than a pre-determined maximum rotational speed, the additional valve only first blocking intake canal if the stroke of the intake valve associated with the intake opening reaches the switching stroke upon the opening stroke.

17. The method as specified in claim 15, wherein in an upper partial range of the switching operation range, the load is larger than a pre-determined switching load, wherein the rotational speed is larger than a pre-determined switching rotational speed, the additional valve only first opening intake canal if the stroke of the intake valve associated with the intake opening reaches the switching stroke upon the closing stroke.

18. The method as specified in claim 16, wherein in an upper partial range of the switching operation range, the load is larger than a pre-determined switching load, wherein the rotational speed is larger than a pre-determined switching rotational speed, the respective additional valve only first opening the respective intake canal if the stroke of the intake valve associated with the respective masked intake opening reaches the switching stroke upon the closing stroke.

19. An internal combustion engine, comprising:
at least one cylinder that delimits a combustion chamber, wherein a piston can be adjusted with regard to stroke,
wherein at least one cylinder has at least one intake opening,
wherein the intake opening is associated with an intake valve that works with an associated valve seat to control the intake opening,
wherein the at least one intake opening is provided with a guide mask that laterally encloses the respective valve seat on a side that is opposite the respective combustion chamber along a delimited circumferential section,
wherein the intake opening is associated with an intake canal,
wherein at least one intake canal leading to a masked intake opening is associated with an additional valve for controlling the intake canal, and
wherein a valve control is provided for actuating the additional valve, the valve control selectively drives the additional valve at pre-determined operational states of the internal combustion engine in order to open and block the respective intake canal as a function of the stroke of the intake valve associated with the intake opening; and
wherein the valve control the additional valve as a function of the current operational state of the internal combustion engine in order to block the respective intake canal so long as the intake valve associated with the intake opening has a stroke that is larger than a pre-determined switching stroke.

* * * * *

UNITED STATES PATENT AND TRADEMARK OFFICE
CERTIFICATE OF CORRECTION

PATENT NO. : 8,365,702 B2
APPLICATION NO. : 12/596287
DATED : February 5, 2013
INVENTOR(S) : Alfred Elsasser Page 1 of 1

It is certified that error appears in the above-identified patent and that said Letters Patent is hereby corrected as shown below:

In the Claim:

At column 7, claim 8, line 54, change "mask," to "mask, and"

Signed and Sealed this
Sixth Day of August, 2013

Teresa Stanek Rea
*Acting Director of the United States Patent and Trademark Office*